Figure 1:
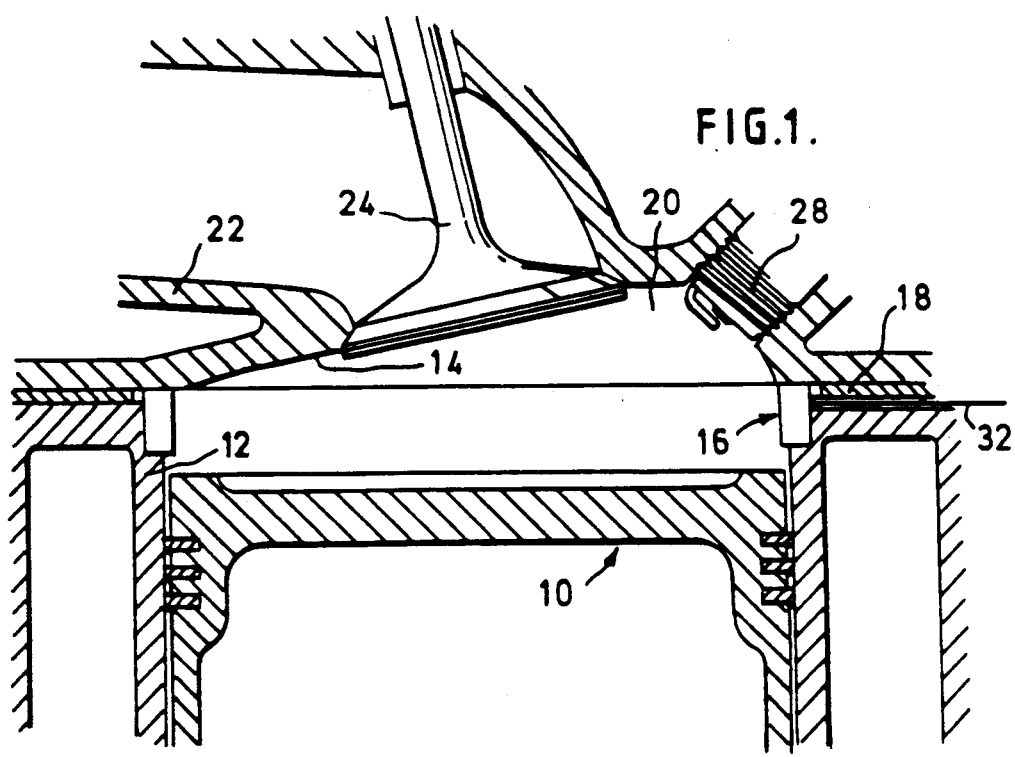

United States Patent [19]

Ma

[11] Patent Number: 5,066,023
[45] Date of Patent: Nov. 19, 1991

[54] IONIZATION SENSOR

[75] Inventor: Thomas T. Ma, South Woodham Ferrers, England

[73] Assignee: Ford Motor Company, Dearborn, Mich.

[21] Appl. No.: 473,969

[22] PCT Filed: Oct. 14, 1988

[86] PCT No.: PCT/GB88/00865
§ 371 Date: Apr. 12, 1990
§ 102(e) Date: Apr. 12, 1990

[87] PCT Pub. No.: WO89/03520
PCT Pub. Date: Apr. 20, 1989

[30] Foreign Application Priority Data
Oct. 16, 1987 [GB] United Kingdom ............... 8724351

[51] Int. Cl.$^5$ ............... G01L 22/23; F02F 11/00; F16J 15/06
[52] U.S. Cl. ............... 277/2; 73/35; 277/235 B; 324/464
[58] Field of Search ............... 277/2, 229, 233, 234, 277/235 A, 235 B; 73/35; 324/459, 464

[56] References Cited

U.S. PATENT DOCUMENTS

| 2,753,199 | 7/1956 | Victor | 277/233 |
| 3,873,102 | 3/1975 | Lotze et al. | 277/2 |
| 4,397,176 | 8/1983 | Rohde et al. | |
| 4,433,198 | 2/1984 | Berner et al. | 277/229 X |
| 4,686,861 | 8/1987 | Morii | 73/35 X |
| 4,743,421 | 5/1988 | McDowell et al. | 277/234 X |

FOREIGN PATENT DOCUMENTS

| 140066 | 5/1985 | European Pat. Off. | |
| 3006656 | 9/1981 | Fed. Rep. of Germany | 277/2 |
| 2917406 | 8/1983 | Fed. Rep. of Germany | |
| 441770 | 11/1985 | Sweden | |

Primary Examiner—William A. Cuchlinski, Jr.
Assistant Examiner—Scott W. Cummings
Attorney, Agent, or Firm—Jerome R. Drouillard; Clifford L. Sadler

[57] ABSTRACT

A cylinder head gasket is described which also serves as an electrode of an ionization sensor. The gasket (16) has an electrically conductive surface portion (16c) which is electrically insulated from the cylinder head (14) and from the engine block (12) so that it may serve as an electrode of an ionization sensor. The gasket of the preferred embodiment is of five layer sandwich construction comprising two outer layers (16a, 16b) of soft metal capable of deformation under pressure to effect a gas tight seal with the block (12) and the cylinder head (14), a central core (16c) of electrically conductive material to serve as an ionization electrode and two layaers of ceramic material (16e, 16f) insulating the central core (16c) from the two outer layers (16a, 16b).

3 Claims, 1 Drawing Sheet

IONIZATION SENSOR

The present invention relates to an ionisation sensor for a combustion chamber of a spark ignited engine.

It is known to use ionisation sensors in a combustion chamber in order to obtain a measure of the flame propagation speed and to detect knocking, the output of the sensor being used as a control parameter in certain engine management systems. The sensor detects the time of arrival of the flame by the increased level of ionisation in the flame. The ionisation is measured by sensing the current flowing between a pair of electrodes which are isolated from one another and across which a potential is applied.

Hitherto, ionisation sensors have comprised an electrode mounted on an insulating body which is screwed into the cylinder at a distance from the spark plug. Apart from requiring an additional access hole in the cylinder body or cylinder head, the electrode was small and the resultant signal had a poor signal to noise ratio.

With a view to mitigating the foregoing disadvantages, the present invention provides a gasket for sealing between an engine block and a cylinder head, characterised by an electrically conductive surface portion which, in use, is electrically insulated from the cylinder head and from the engine block so that it may serve as an electrode of an ionisation sensor.

Because the cylinder head gasket serves as the ionisation sensor, there is no need to form any special access holes in the cylinder head. Also, it is possible in this way to achieve a large area electrode without altering the geometry of the combustion chamber. The large area of the electrode improves signal to noise ratio and avoids errors caused by local anomalies.

A cylinder head gasket serves many sealing functions in that it not only prevents escapes of gases under high pressure from the combustion chamber but also seals various low pressure passages for oil and water. It is not essential, however, for the same gasket to perform all these functions and instead it is preferred to provide an annular gasket for each combustion chamber to effect a high pressure seal and to provide a separate softer gasket to seal the water and oil passages.

In this case, the electrical lead connected to the sensing electrode portion of the annular gasket be passed through a channel recessed into the cylinder head or the cylinder block and covered by the soft gasket.

Preferably, the annular gasket comprises a five layer sandwich comprising two outer layers of soft metal capable of deformation under pressure to effect a gas tight seal with the block and the cylinder head, a central core of electrically conductive material to serve as an ionisation electrode and two layers of ceramic material insulating the central core from the two outer layers.

The central core may conveniently comprise a collapsible hollow box structure having a resilient filling, which is capable of taking up any tolerances in the cylinder head and cylinder block.

The radially inner surface of the gasket may be coated in selected regions with a ceramic layer so that only the uncoated parts of the surface of the gasket may act as a sensing electrode. The ionisation sensing portions of the gasket may in this way be positioned as desired relative to the spark plug.

Figure 2:
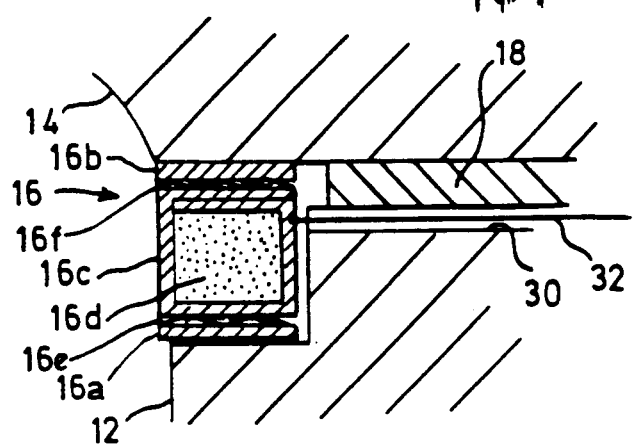
Figure 3:
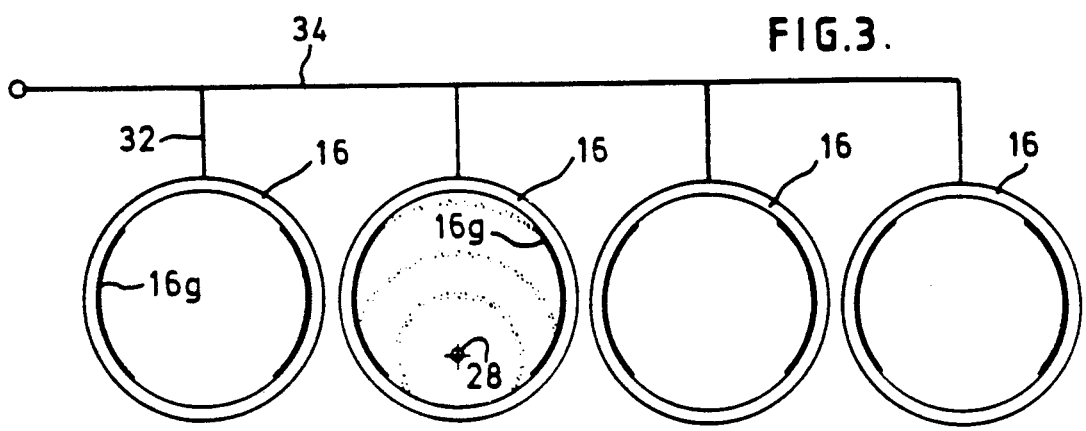

The invention will now be described further, by way of example, with reference to the accompanying drawings, in which:

FIG. 1 shows a partial section through combustion chamber in which the cylinder head gasket is designed to act as an electrode of an ionisation sensor, FIG. 2 shows part of FIG. 1 drawn to an enlarged scale, and FIG. 3 is a schematic representation showing the ionisation sensors of a four cylinder engine.

Figure shows a section through a combustion chamber of an internal combustion engine. The walls of the combustion chamber 20 are defined by a piston 10, a cylinder 12, a cylinder head 14 and a head gasket 16. The drawing also shows an inlet poppet valve 24 closing off an inlet port 22 and a spark plug 28. The cylinder head and engine block may be generally conventional and they need not therefore be described in detail.

The cylinder head gasket 16, as better seen in FIG. 2, is of substantial thickness, for example 5 mm, and sits in a shoulder in the cylinder block. The gasket 16 is a ring formed as a five layer sandwich construction. The two outer layers 16a and 16b are both of soft metal so that they may seal against the block 12 and the cylinder head 14, respectively. The central core 16c is also of electrically conductive material and is in the form of a hollow box filled with a springy material 16d, such as a corrugated spring. This constructions allows the box to be crushed under pressure to take up and tolerances in the machining of the block and the cylinder head.

The core 16c also acts as an electrode of an ionisation sensor and needs therefore to be electrically isolated from the cylinder head 14 and the cylinder block 12. For this purpose, two layers of ceramic material 16e and 16f and arranged between the central core 16 and the outer layers 16a and 16b, respectively.

The gasket 16 only seals the combustion chamber and a separate soft gasket 18 is arranged between the cylinder head 14 and the block 12 to seal off the low pressure oil and water passages. The block 12 has a recess 30 which permits a lead 32 to pass from the ionisation sensing electrode formed by the central core 16c of the gasket 16 to the outside of the engine for connection to the ignition system.

As can be seen from FIG. 3, all the leads 32 may be connected to one another within the block and an external connection need only be provided for a single bus bar 34 connected to all the gaskets 16. FIG. 3 also shows that the annular surface of the central core 16c of the gasket may be selectively coated by a ceramic layer 16g so that only certain parts of the circumference of the gasket are sensitive to the flame.

In use, a potential is applied between the central core 16c of the gasket and the engine block 12 and cylinder head 14, this being possible in view of the electrical insulation afforded by the ceramic layers 16e and 16f in the gasket 16. When the flame propagating from the spark plug 28 reaches an unshielded part of the surface of the central core 16c of the gasket, the current flow in the external circuit will increase on account of the gas ionisation and the current waveform can be monitored to indicate flame arrival time.

Because a sensing electrode of large area can be formed by the gasket 16, it is possible to obtain a signal of signal to noise ratio, thus improving the accuracy of measurement of the flame propagation speed.

It is also an advantage that the signal will indicate the mean flame arrival time and will not be sensitive to variations at any one point around the circumference which may be caused by gas turbulence.

The flame propagation speed or time of arrival of the flame front can be used in a variety of ways to ensure correct fuelling and spark timing of the engine but such control systems are known and need not be described in detail in the context of the present invention.

In addition to the advantages outlined above, it is important to note that the invention avoids the need for an access hole leading to the combustion chamber. This advantage is particularly important in modern engines designed for lean burn and employing a large number of valves. In such engines, space in the cylinder head is at a premium and it is difficult to provide any form of access hole for an ionisation sensor, and in particular one which is well spaced from the spark plug to reduce errors in determining the flame propagation speed.

I claim:

1. A gasket for sealing between an engine block and a cylinder head, characterised by an electrically conductive surface portion (16c) which, in use, is electrically insulated from the cylinder head (14) and from the engine block (12) so that it may serve as an electrode of an ionisation sensor, said gasket (16) formed as a ring of five layer sandwich construction, comprising two outer layers (16a, 16b) of soft metal capable of deformation under pressure to effect a gas tight seal with the block and the cylinder head, a central core (16c) of electrically conductive material to serve as an ionisation electrode and two layers of ceramic material (16e, 16f) insulating the central core from the outer two layers.

2. A gasket as claimed in claim 2 characterised in that the central core (16c) comprises a collapsible hollow box structure having a resilient filling (16d).

3. A gasket as claimed in claim 1, characterised in that the radially inner surface of the gasket is coated in selected regions (16g) with a ceramic layer so that only the uncoated parts of the surface of the gasket may act as a sensing electrode.

* * * * *